(12) United States Patent
Hadder

(10) Patent No.: US 6,530,225 B1
(45) Date of Patent: Mar. 11, 2003

(54) WAFFLE COOLING

(75) Inventor: James Lolnell Hadder, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 26 days.

(21) Appl. No.: 09/960,753

(22) Filed: Sep. 21, 2001

(51) Int. Cl.⁷ ................................................. F23R 3/00
(52) U.S. Cl. ........................................... 60/772; 60/752
(58) Field of Search .................... 60/772, 752; 137/335; 428/180

(56) References Cited

U.S. PATENT DOCUMENTS

| | | |
|---|---|---|
| 4,044,186 A | 8/1977 | Stangeland |
| 4,146,666 A | 3/1979 | Houtlosser |
| 4,269,032 A | 5/1981 | Meginnis et al. |
| 4,302,940 A | 12/1981 | Meginnis |
| 4,315,406 A | 2/1982 | Bhangu et al. |
| 4,361,010 A | 11/1982 | Tanrikut et al. |
| 4,446,693 A | 5/1984 | Pidcock et al. |
| 4,642,993 A | 2/1987 | Sweet |
| 4,696,431 A | 9/1987 | Buxe |
| 4,781,248 A | 11/1988 | Pfeiffer |
| 4,832,999 A | 5/1989 | Sweet |
| 4,864,827 A | 9/1989 | Richardson et al. |
| 4,887,663 A | 12/1989 | Auxier et al. |
| 5,216,886 A | * 6/1993 | Ewing .......................... 60/752 |
| 5,363,654 A | 11/1994 | Lee |
| 5,495,873 A | 3/1996 | Butkiewicz et al. |
| 5,501,011 A | 3/1996 | Pellet |
| 5,822,853 A | 10/1998 | Ritter et al. |

* cited by examiner

Primary Examiner—Ehud Gartenberg
(74) Attorney, Agent, or Firm—Robert Desmond, Esq.

(57) ABSTRACT

Walls that require cooling, including combustor walls of jet engines, having two members forming a waffle shaped structure are described. The dual member structure comprises passages for incoming air, which zigzag through part of the waffle structure. The air is then released to the combustor or exhausted elsewhere. Additionally, the need for a cool film on one side of the wall may be eliminated. The waffle shaped structure disclosed is relative easy to manufacture.

21 Claims, 3 Drawing Sheets

WAFFLE COOLING

BACKGROUND OF THE INVENTION

This invention relates to the cooling of thin walls for various aerospace applications and, more specifically, this invention relates to the cooling of thin walls using a waffle structure.

Various devices such as combustor liners, other exhaust structures or similar structures, and walls of rocket engine, need cooling. The air used for air/fuel mixtures can be used advantageously for that purpose. It is known that efficient burning of fuel is a goal for good turbine engine designs but the burning of fuel necessarily involves heat generation. Further, the burning of fuel also necessarily causes environmental problems necessitating the reduction of dangerous emissions. How to dissipate the generated heat and how to use the cooling air effectively becomes an important design issue. In addition, the difference in temperature in various parts of the thin walls challenges designers in that they need to consider both the efficiency of fuel burning and the structural integrity of the thin walls. Structural design of thin walls such as those for combustion liners is generally based on experience with previous systems. Various patents have addressed the issue.

U.S. Pat. No. 4,642,993, entitled Combustor Liner Wall, teaches a combustor liner wall with an interior wall, an exterior wall, and a honeycomb structure disposed therebetween. The honeycomb structure is formed with generally radially aligned cells. The patent teaches a structure known in the art as licolite. However, it does not address the issue of thermal growth differences between the hot and cold walls of a panel structure, which may result in high stresses for even moderately sized combustors. To solve the above problem, the walls are divided into small panels where spent cooling air is dumped. This may result in release of dangerous emissions.

U.S. Pat. No. 4,864,827, entitled Combustor, teaches a gas turbine engine combustor with a semi-spherical upstream wall comprised of two correspondingly shaped skins spaced apart by pedestals attached to one of the skins to define a space between them. In other words, this patent maintains a space between two walls by the use of pedestals. The two walls float, or move, relative to each other so as to relieve the geometrical changes that result from temperature variations. However, this does not allow a stable gap between the two walls. Further, for relatively large structures this patent may be impractical in that no stable gap can be maintained because the pedestals are not rigidly affixed to at least one of the walls.

U.S. Pat. No. 5,822,853, entitled Method for Making Cylindrical Structures with Cooling Channels, teaches a gas turbine having a double wall with a plurality of cooling channels therebetween. The cooling channels are formed between the inner member of the structure and the outer member thereof. In other words, the patent addresses a method of manufacturing, involving a sandwiched panel. However, the walls are not rigidly connected to each other and, therefore, the problem of thermal growth difference between the two walls is not resolved. Also, as can be appreciated, the fact that there is no rigid connection between the walls causes at least a reduction in efficiency with regard to heat transfer. Further, the lack of connection between the walls may make the concept impractical for larger structures.

As can be seen, there is a need for a method and apparatus to deal with thermal growth differences occurring between adjacently located hot and cold walls of panel structures, and which does not result in high stresses during operation. Further, it is desirable to have a simple structure that is easy to fabricate, and at the same time fulfills the need of cooling the apparatus. The waffle cooling satisfies that need. The second wall is an irregular non smooth surface that responds somewhat like a bellows, and expands and contracts with respect to the thermal expansion of the first surface thus reducing the stresses that are generated by the difference in temperatures between the two surfaces.

SUMMARY OF THE INVENTION

In one aspect of the present invention, there is disclosed an apparatus for cooling thin walls that comprises a first member, which has a smooth surface; a second member, which has an uneven surface disposed to form a plurality of cavities by rigidly affixing part of the uneven surface onto the smooth surface of the first member, and a plurality of openings connecting at least two cavities; and at least one opening in a first cavity for receiving incoming air, as well as at least one opening in a second cavity for disposing out-going air, whereby the temperature, as well as the temperature difference between the members, is reduced.

In another aspect of the present invention, there is disclosed an apparatus for cooling thin walls that comprises a first wall having a generally smooth shape with a first surface, and a second surface; a second wall having a waffle shape, wherein a plurality of cavities are formed, each cavity being defined by four sides with part of the cavity sides rigidly affixed to the first surface of the first wall; and a plurality of gaps formed at the sides of the cavities that are non-rigidly affixed to the first surface of the first wall, thereby forming a passage for air to flow from one end of the apparatus to the other through at least some cavities, whereby the first wall and the second wall are cooled.

In a further aspect of the present invention, a combustor is described comprising an inflow of air having a primary flow into an inner cylinder, and a secondary flow into an air casing defined and limited by the inner cylinder and an outer cylinder. The combustor further comprises a first wall that is part of the outer limit of the inner cylinder, which has a generally smooth shape, and which includes a first surface, and a second surface. A second wall is also provided that is part of the outer limit of the inner cylinder, which has a waffle shape within which there is a plurality of waffle shaped cavities. Further, each cavity is defined by four sides with part of the cavity sides being rigidly affixed to the first surface of the first wall, whereby a plurality of gaps is formed at the sides of the cavities that are non-rigidly affixed to the first surface of the first wall, thus forming a passage for air to flow from one end of the apparatus to the other end through at least some cavities. Thereby, the first wall and the second wall are cooled.

In yet another aspect of the present invention, a method for making a cooling device comprises the steps of providing a first member that has a generally smooth surface, providing a second member having a waffle shape with a plurality of trapezoidal shaped cavities each having four sides, and affixing at least some of the four sides onto the first member.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
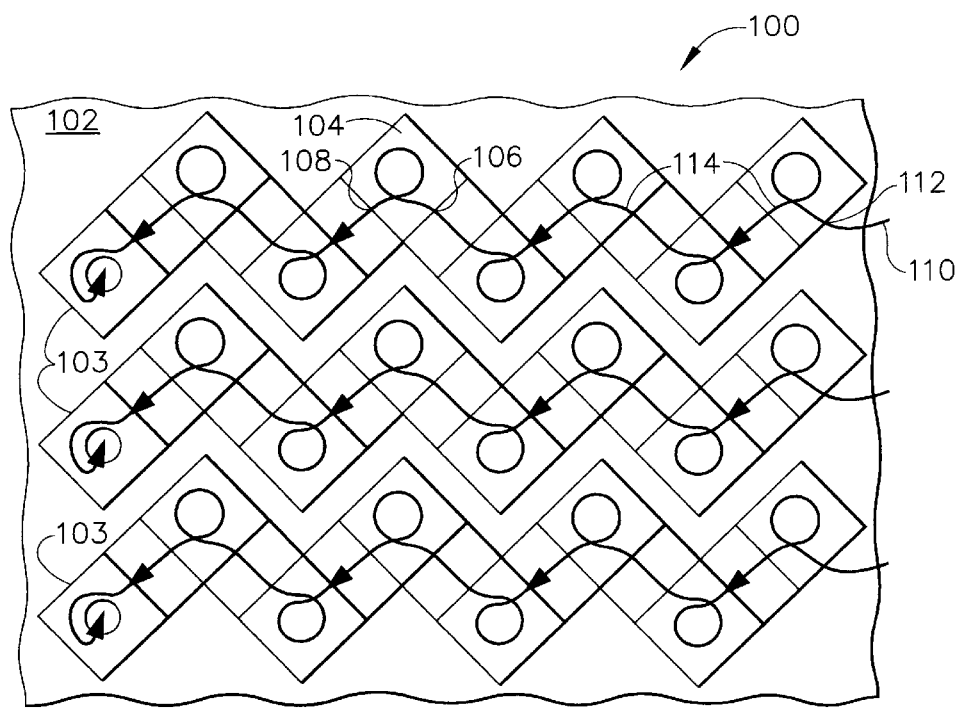
FIG. 1 depicts a schematic diagram of one embodiment of the present invention.

Referring to FIG. 1, numeral 100 denotes a waffle cooling apparatus embodying the present invention. A first or inner member 102 may be generally smooth in that it has at least one smooth (i.e., even or planar) surface made of flexible material, such as HA230 or HS188 made by Haynes International, such that the inner member 102 can be bent (not shown) to form a curve along with a second or outer member 103. The outer member 103 may also be made of generally flexible material, such as HA230, HS188 or HastX made by Haynes International, but is not smooth (i.e., not even or planar) in form or shape. For example, the outer member 103 may have indentations such that a set of cavities can be formed utilizing the concave volume generated by the indentations. Thus, air can pass between the inner member 102 and the outer member 103.

The outer member 103 can be formed by a plurality of airflow units of which at least one allows an airflow 114 therethrough. Each unit can comprise a plurality of cavities, with one representative cavity being intermediate cavity 104. Intermediate cavity 104 may generally have four sides for ease of fabrication. However, intermediate cavity 104 may have a lesser or greater number of sides. Some considerations in determining the number of sides are ease of fabrication, and rigidity of the connection between the inner member 102 and the outer member 103 for efficient heat transfer between them. The intermediate cavity 104 can further comprise or define an air gap 106 such as for air intake into such cavity 104 when air flows out of one cavity and then flows into an adjacent cavity 104. The intake gap 106 may be an opening having a circumference (not shown) formed by portions of the inner member 102 and the outer member 103.

Intermediate cavity 104 can also have an air opening or gap 108 such as for air outflow from the cavity 104 when air flows out of one cavity 104 and into an adjacent downstream cavity 104. Similarly arranged cavities can thereby define at least part of an air passage which will be described below. The shape and circumference of the air outflow gap 108 can be identical to that of the intake gap 106, or it could be different. But the particular shape, size, and circumference of the openings or gaps 106 and 108 are based on the goal of efficient cooling of the walls or the inner and outer members 102, 103, thus precluding undue stresses on the inner member 102 since a heat source (not shown) may cause the inner member 102 to be at a relatively higher temperature than that of the outer member 103. It is evident that one wall may be cooler than the other and it is desirous to have a suitable structure that reduces this temperature difference as well as cools the inner and outer members 102, 103.

Still referring to FIG. 1, and for purposes of illustration, incoming air 110 can form an initial airflow through an initial inflow gap 112. Incoming air 110 can define an airflow 114 that traverses a plurality of cavities 104. In other words, the cavities are interconnected such that the airflow 114 may traverse through the cavities via gaps on the sides of cavities such as at the intake gap 106 and air outflow gap 108. Desirably, the airflow 114 follows a tortuous path as opposed to a straight one for greater cooling.

Outer member 103 may be subdivided into a plurality of independent airflow units. In each unit, an air passage can exist through which an airflow 114 can pass. For example, air passages may zigzag through units of similar shape and form as that of air passage 104. Other than the gaps 106 and 108, the sides of the cavities on the outer member 103 can be rigidly attached to inner member 102. The inner and outer members 102 and 103 may be made of iron, aluminum, nickel, cobalt or related alloys. The inner and outer members 102 and 103 may be bonded to each other using bonding techniques know in the art and made of iron, aluminum, nickel, cobalt, or related alloys. A primary goal is to have a predetermined amount of air flowing through a particular area of the apparatus 100 that is comprised of inner member 102 and outer member 103. Once the inner and outer members 102 and 103 are bonded to each other, the combined structure may be formed to achieve a desired shape. The bonding process increases the thermal unity between the inner member 102 and the outer member 103 because heat transfers more readily between the members. This is primarily because there are no other elements or materials existing between the inner member 102 and the outer member 103.

Another feature of the invention is that air passage 104 may be adjusted in size and shape to achieve an optimal cooling effect. For example, the zigzag pattern of air passage 104 may be modified at different portions of the structure to address heat intensity variations.

Figure 2:
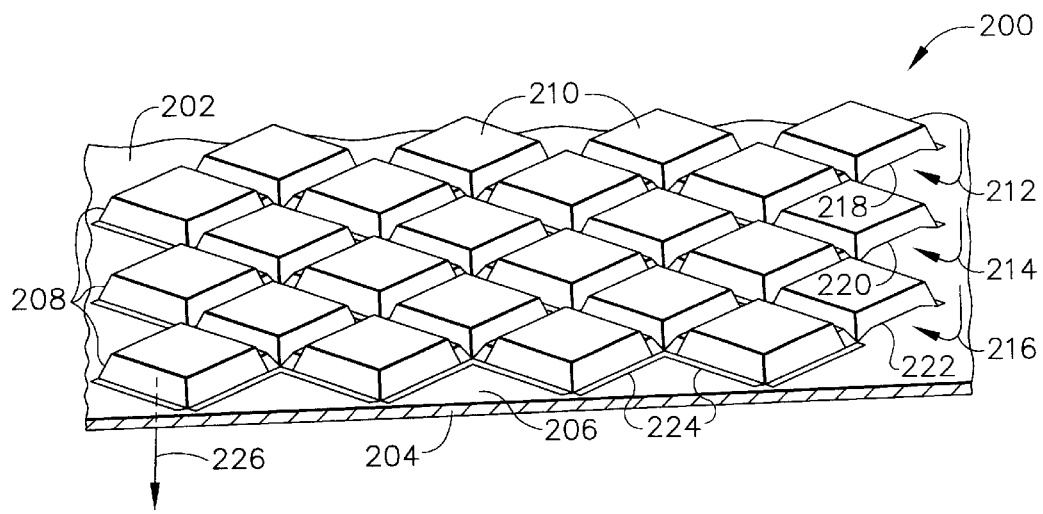
FIG. 2 depicts a perspective view of the present invention.

Referring to FIG. 2, numeral 200 generally depicts a perspective view of the structure depicted in FIG. 1. First or inner member 202 can comprise an inner surface 204 and an outer surface 206. Generally, a heat source (not shown) may be located at the side of the inner surface 204, Thereby, heat may be dissipated geometrically first to the inner surface 204, then to the outer surface 206 of the inner member 202, and then to a second or outer member 208. A plurality of cavities, such as cavities 210, can form part of an interconnection path (not shown) wherein an air passageway (not shown) is defined. It is contemplated that a plurality of interconnection paths may be formed.

Incoming air (depicted by arrows 212, 214 and 216) can flow through respective openings or gaps in the cavities 210. For example, incoming air 212 may flow into gap 218, incoming air 214 may flow into gap 220, and incoming air 216 may flow into gap 222.

The sides 224 of cavities 210 may be rigidly affixed to the outer surface 206. For instance, the sides 224 of cavities 210 can be made out of the same material as the outer member 208, and may be bonded onto the outer surface 206, which may be made out of similar materials. As can be appreciated, some cavities 210 may be interconnected to each other, whereby an interconnect (not shown) is formed as a subset of all the cavities. This may be demonstrated by referring back to FIG. 1, wherein the outer member 103 comprises a plurality of independent zigzag sub-units or subsets. This necessarily requires openings on some sides of some cavities 210. Hence, the opening portions (not shown) in between cavities of the sides 224 of cavities 210 are not rigidly affixed upon the outer surface 206. This is also true for the inflow gaps 218, 220, 222 since the members are not rigidly affixed to each other as there is an opening in between. However, other than the inflow gaps 218, 220, and 222, and the openings on the sides (not shown), the sides may be affixed rigidly onto a smooth surface of the first member or the outer surface 206.

The instant invention is described as waffle cooling because the cavities 210, and the sides 224 of cavities 210, together form a structure that is similar in configuration to a waffle, and its purpose is for cooling. However, the sides 224 of cavities 210 do not have to be equal in length, and the angle between the adjacent sides does not have to be ninety degrees or the same angle. In addition, since the finished waffle shaped structure may need to be bent in the shape of a curve, the resultant shape of the waffle cooling pattern may be trapezoidal, albeit on a non-flat plane.

As can be appreciated, the outer member 208 may comprise a plurality of units such the independent zigzag airflow patterns. Each unit can further comprise an interconnect wherein an air passage (not shown), such as air passage 104 of FIG. 1, is defined. Each unit may be independent in that no connections exist between units or, alternatively, each unit may be dependent and connected to each other. It is evident that more than one unit may exist in the apparatus.

An air outlet 226 can be provided at the end of each airflow passage 104. The air inflow can be any one of the air inflows 212, 214, 216. The function of this air outlet 226 may be to serve as an outlet for cooling air, as well as other purposes. For example, with a combustor, expended cooling air coming out of air outlet 226 may mix with fuel in a primary zone and be utilized for combustion purposes.

Since one the main purposes of the invention is cooling, it follows that the volume of air passing through any interconnect can increase, or reduce the cooling. A working definition of the interconnect is the space wherein each subset of cavities 210 is interconnected by openings. Therefore, the geometric configuration of the interconnect can determine the amount of airflow that passes through it. The geometric configuration includes, but is not limited to, the size of the inflow gaps 218, 220, 222, and other openings (not shown) between cavities 210. In addition, heat conduction characteristics of the material constituting the apparatus may also be significant.

FIGS. 1 and 2 illustrate only one embodiment of the instant invention. Variations in the heat intensity of various regions of the inventive waffle cooling apparatus may vary. It follows, therefore, that the amount of air passing through any interconnect can be increased or decreased depending on the extent of the cooling required. As a result, it may be desirable to modify some of the dimensional parameters of the inventive waffle cooling apparatus. Examples include increasing the opening of the initial airflow gap 112, the incoming air flows 212, the interconnecting intake gap 106, and the air outflow gap 108.

Figure 3:
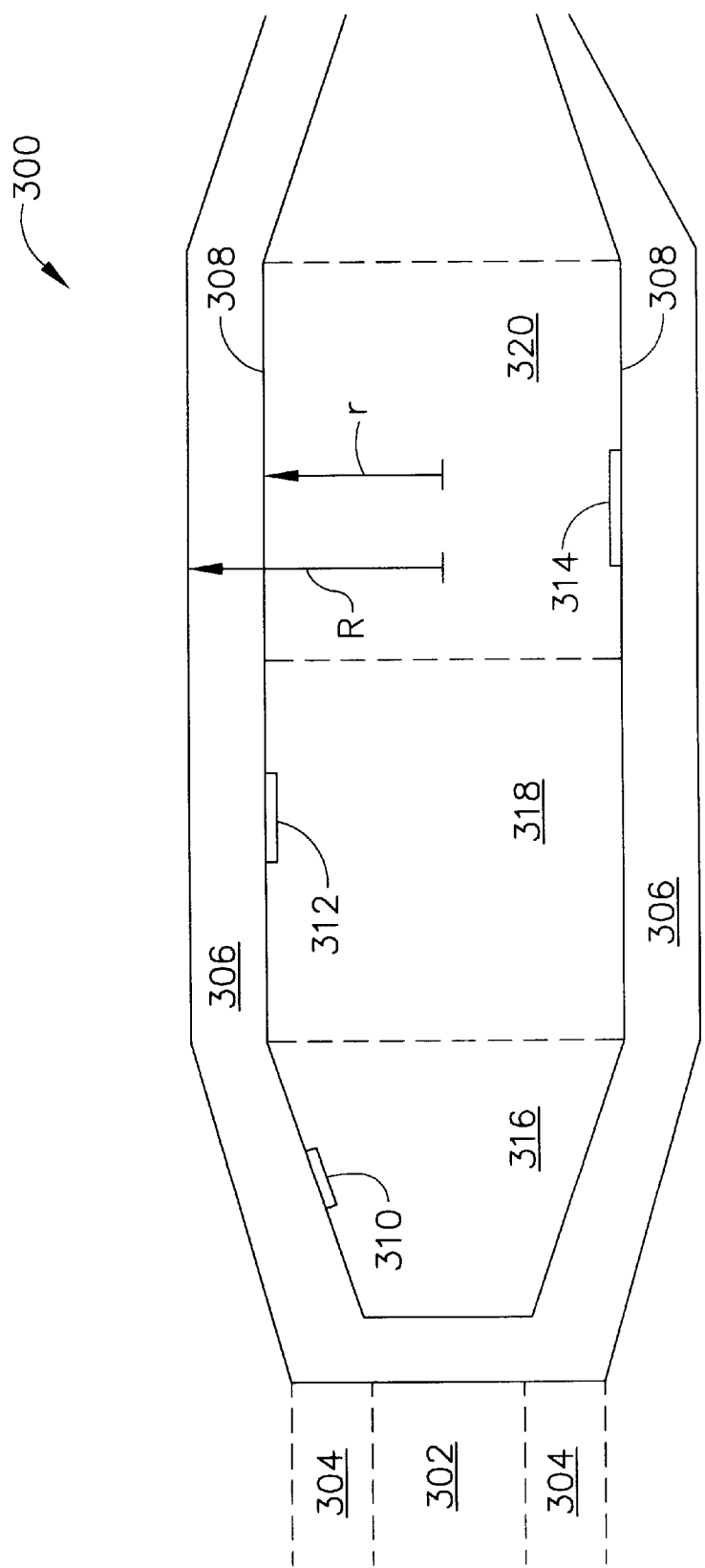
FIG. 3 depicts a schematic flow of a combustion chamber.

Referring now to FIG. 3, there is shown a schematic flow 300 of a combustion chamber wherein the instant invention can be used. A compressor (not shown) can discharge airflow at a velocity of about 490 ft/sec for purposes of illustration. This velocity may not be suitable for combustion and must be reduced. Air flowing into the combustion chamber can comprise primary airflow 302 and secondary airflow 304. Upon reaching a suitable velocity, with a concomitant increase in pressure as well, the primary airflow 302 can enter the combustion chamber. The secondary airflow 304 may then flow into air casing 306 defined as the space between an inner cylinder having a radius r and an outer cylinder having a radius R. On the inner cylinder wall 308, the structure of the instant invention may be applied. For example, the present invention may be applied at areas 310, 312, and 314 which are located on regions 316, 318, and 320, respectively. It is known in the art that the primary airflow 302 contributes about 10–20% of the total air mass used for combustion. The balance comes from other sources including the secondary airflow 304. Therefore, the waffle structure of this invention may be used for the combustion chamber at areas 310, 312, 314 that are located on regions 316, 318, and 320 respectively. As can be appreciated, the secondary airflow 304 can be used both for combustion as well as for cooling purposes.

A typical combustion chamber receives 20% of its air from the primary airflow 302, predominantly within region 316. The balance of the air comes from the secondary airflow 304, from which 10% goes into region 318 and about 70–80% goes into region 320. Because different regions require different amounts of air, and there may be variations of pressure at various locations within the air casing 306, the opening that takes the air in, for example areas 310, 312, 314 having the waffle structure for air intake and the opening that disposes of the air, needs to be suitably designed. For example, the dimension or specifically the diameter of the openings such as the inflow gaps 218, 220, 222, the direction of the openings, and the size of the interconnect, need to be designed accordingly for optimal performance including sufficient air for sufficient cooling. The design must take into consideration various factors such as: sufficient air be fed into the combustion chamber at various locations or regions; air passing through be sufficient such that the walls 308 of the inner cylinder such as 204 and 206 of FIG. 2 be adequately cooled; the apparatus used be easy to fabricate; and the structure of the apparatus be sufficient for a limited air intake. Certain locations of the combustion chamber cylindrical wall 308 may need no cooling, and would not benefit from the use of the present invention. The present invention may accordingly be selectively applied on an as needed basis at locations where other forms of cooling are insufficient.

Figure 4:
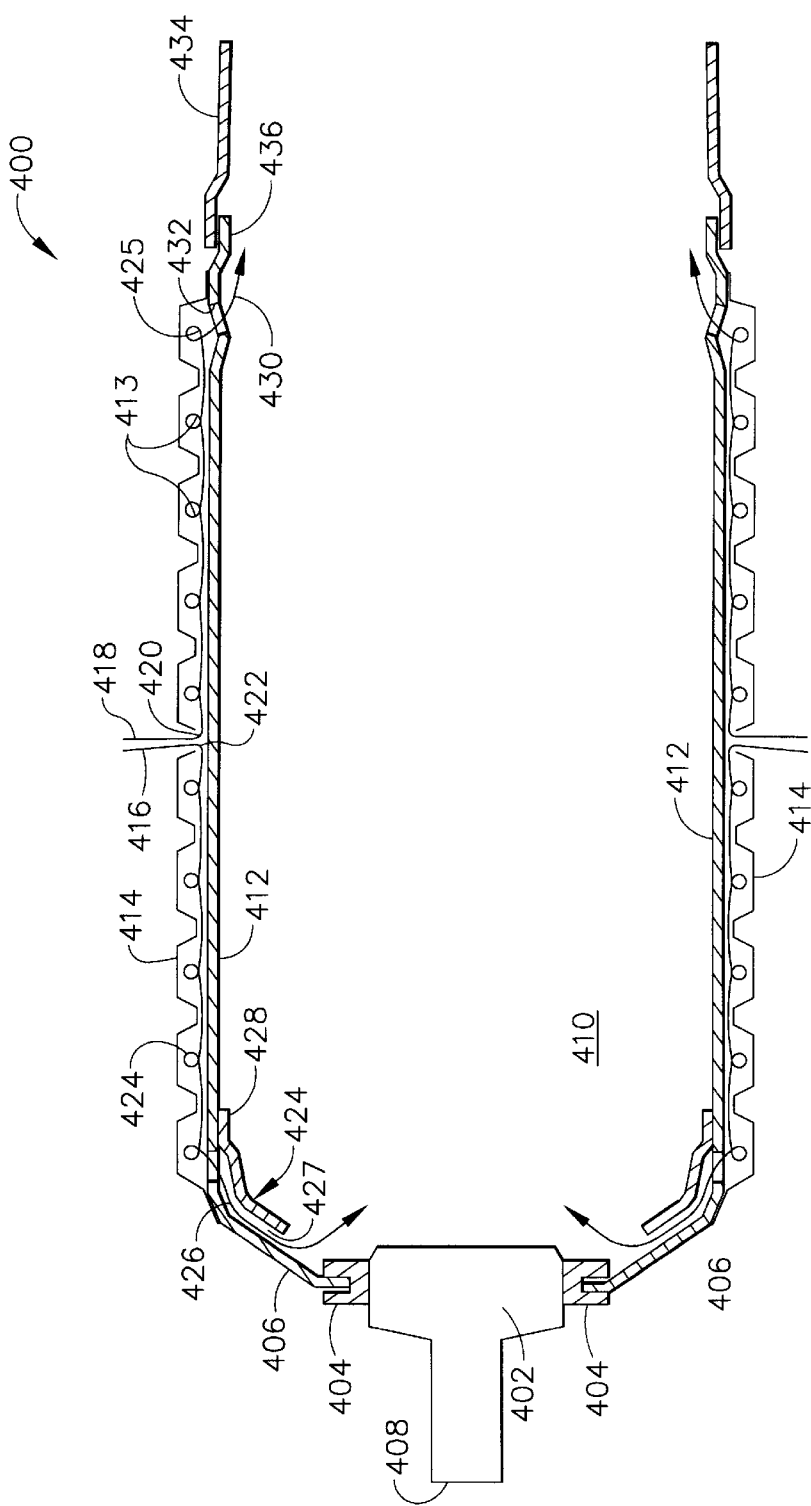
FIG. 4 depicts an embodiment of the present invention for a can-type combustor.

Referring now to FIG. 4, there is shown a can-type combustor 400, wherein the present invention may be applied. An atomizer swirler assembly 402, having a generally cylindrical shape, is located at a first end 408 of the can-type combustor 400. The atomizer swirler assembly 402 comprises a coupling element 404 that circumferentially couples with a wall portion 406 that forms part of an inner cylindrical wall. The atomizer swirler assembly 402 typically receives primary airflow at a first end 408 at a high velocity, processes the air, and inputs the same into an inner cylindrical space 410 at a reduced velocity. Wall portion 406 extends to first member region 412, wherein the inventive waffle cooling structure is desirable.

The waffle cooling structure comprises a second member 414 that has concave regions 413 disposed to form a plurality of cavities in combination with the outer smooth surface the first member 412. It should be noted that the present invention is an improvement over prior art in that there is no need for any other structural component other than the first member 412 and the second member 414. For example, there is no need for a third element between the first member 412 and the second member 414. Air 416, 418 from secondary air source enters the waffle cooling structure via slots 422 and 420 respectively.

Air 416 enters slot 422 defining the beginning of a first passage 424 that traverses an interconnect comprised of a subset of a plurality of cavities interconnected together, slot 422, and first passage 424. First passage 424 comprises an opening 426 on wall portion 406 and an outlet channel 427. Outlet channel 427 is limited by wall portion 406 and an extension member 428. Expended air cools the first member 412 (and to some extent cools the second member 414) and comes out of the outlet channel 427. The expended air, in turn, mixes with fuel in the primary zone of the inner cylindrical space 410. At the end of the combustor, turbine transition duct 434 of a generally cylindrical shape is coupled to the end 436 of the first member 412.

Similarly, air 418 enters slot 420 that defines a beginning of a second passage 425 that traverses an interconnect comprised of a subset of cavities interconnected together, slot 420, and outlet 430. The outlet 430 is comprised of an opening 432 on first member 412. Expended air cools the first member 412. The expended air also, to some extent, cools the second member 414. Further, expended air comes out of the outlet 430 at the combustor exit segment.

Similar inventive waffle cooling structures may be provided at other locations or regions of the combustor where cooling is desired. The specific geometric configurations of such additional waffle cooling structures may be varied as necessary to provide the requisite cooling characteristics.

As can be appreciated, the present invention provides cooling to thin walls (e.g., about 0.015 to 0.100 inches thick) of structures such as, but without limitation, combustor liners. Cooling passages are formed by a subset of cavities between two bonded pieces of sheet metal. The first piece comprises at least one smooth surface and forms the structural wall that is to be cooled. The second piece is waffled to form cavities on at least one smooth surface. The cavities are interconnected with gaps to form a passage for air to zigzag from a first end to a second end of a panel as needed. In the present form of the invention, the narrow gap between the cavities accelerates the air, increases the turbulence, correspondingly increasing the heat transfer co-efficient. Air enters the passageways through gaps at one end of the passages and exits to the hot flow path at the other end. It should be noted that there may be one opening at the exit of each passage such as 426 or 430, but may merge into a common slot such as 427.

One notable feature of the present invention is that this type of cooling may allow walls such as the first member 412 of FIG. 4 to be cooled without a cold film on the hot side of the combustor. This may reduce hydrocarbon and carbon monoxide emissions. As can be appreciated, cool boundary layers along the walls are known to have the tendency to quench the combustion reaction, thus producing by-products of incomplete combustion such as CO and UHC. However, as an alternative, the cold film may be introduced in such cases to further enhance cooling, or if emissions are not of primary concern.

As a general matter, with regard to the waffle cooling of the present invention in relation to other types of cooling, the amount of air used should be comparable to that of effusion cooling. However, the need for the introduction of the cold film on the inner side of the wall or first member 412 may not be required. Furthermore, the first member generally a thin wall having a limited thickness of about 015 to 100 inches.

It should be understood, of course, that the foregoing relates to preferred embodiments of the invention and that modifications may be made without departing from the spirit and scope of the invention as set forth in the following claims. For example, the present invention can be applied not only in a can-type combustor, but in an annular-type combustor and can-annular-type combustor as well. Furthermore, other exhaust system structures may benefit from use of this invention as well.

We claim:

1. An apparatus for cooling, comprising:
    a first member having a smooth surface;
    a second member having an uneven surface disposed to form a plurality of cavities by affixing the uneven surface onto the smooth surface of the first member;
    a plurality of openings having an airflow connecting together at least a first cavity and a second cavity;
    at least one opening in the first cavity for receiving incoming air; and
    at least another opening in the second cavity for disposing out-going air,
    whereby a temperature of, as well as the temperature difference between, the first and second members is reduced.

2. The apparatus of claim 1, wherein sides of the first and second cavities are bonded to the smooth surface of the first member.

3. The apparatus of claim 1, wherein the first and second cavities form an airflow passage.

4. The apparatus of claim 1, wherein the first and second members form a plurality of airflow passages.

5. The apparatus of claim 4, wherein the plurality of airflow passages are airflow independent of one another.

6. The apparatus of claim 4, wherein at least two of the airflow passages are airflow connected to one another.

7. The apparatus of claim 1, wherein the first member comprises a first side free of a cold film.

8. An apparatus for cooling walls, comprising:
    a first wall having a first surface and a corresponding second surface;
    a second wall having a waffle shape with a plurality of cavities being formed therein;
    each cavity being defined by a plurality of sides with a part of the cavity sides rigidly affixed to the first surface of the first wall; and
    a plurality of gaps formed at sides of the cavities that are non-rigidly affixed to the first surface of the first wall;
    said gaps form a passage for air to flow from one end of the apparatus to another end through at least some of the cavities,
    whereby the first wall and the second wall are cooled or the stress thereupon released.

9. The apparatus of claim 8, wherein the second surface covers only a portion of the first wall.

10. The apparatus of claim 8, wherein the second surface of the first wall is heated by a heat source abuts the second surface.

11. The apparatus of claim 8, wherein at least one gap is formed for air in-take.

12. The apparatus of claim 8, wherein the passage flows air in a tortuous pattern.

13. The apparatus of claim 12, wherein the passage flows air in a zigzag pattern.

14. A combustor, comprising:
    an inflow of air having a primary air flow flowing into an inner cylinder and a secondary air flow flowing into an air casing defined and limited by the inner cylinder and an outer cylinder;
    a first wall being part of an outer limit of the inner cylinder and having a first surface and a second surface;

a second wall being part of the outer limit of the inner cylinder and having a waffle shape that forms a plurality of cavities;

each cavity being defined by four sides with part of the cavity sides rigidly affixed to the first surface of the first wall; and a plurality of gaps formed at the sides of the cavities that are non-rigidly affixed to the first surface of the first wall to provide a passage for air to flow from one end of the apparatus to another end of the apparatus through at least some of the cavities, whereby the first wall and the second wall are cooled or stress thereon are released.

15. The combustor of claim 14, wherein the combustor is comprised of a can-type combustion chamber.

16. The combustor of claim 14, wherein the combustor is comprised of an annular type combustion chamber.

17. The combustor of claim 14, wherein the combustor is comprised of a can-annular-type combustion chamber.

18. A method for cooling walls, comprising the steps of:

providing a first wall having a smooth surface;

providing a second wall having a waffle shape with a plurality of cavities each having a plurality of sides;

affixing at least some of the sides to the first member; and flowing air through said cavities along a tortuous passage, whereby said first and second walls are cooled or stress thereon are released.

19. The method of claim 18, further comprising the step of flowing the air from one cavity to an adjacent cavity.

20. The method of claim 19, further comprising the step of flowing the air through a plurality of air passages.

21. The method of claim 20, further comprising the step of flowing the air in a plurality of tortuous patterns.

* * * * *